(12) United States Patent
Wang et al.

(10) Patent No.: US 9,461,908 B2
(45) Date of Patent: Oct. 4, 2016

(54) METHOD OF ROUTE CONVERGENCE, ROUTING DEVICE, AND MAIN CONTROL BOARD IN ROUTING DEVICE

(75) Inventors: Chang Wang, Shenzhen (CN); Yong Li, Shenzhen (CN); Hui Ni, Shenzhen (CN); Yuan Rao, Shenzhen (CN); Zhengliang Li, Shenzhen (CN); Lei Fan, Shenzhen (CN); Xiaohui Liu, Shenzhen (CN); Qing Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1183 days.

(21) Appl. No.: 12/505,825

(22) Filed: Jul. 20, 2009

(65) Prior Publication Data

US 2009/0279557 A1 Nov. 12, 2009

Related U.S. Application Data

(63) Continuation of application No. PCT/CN2008/070833, filed on Apr. 28, 2008.

(30) Foreign Application Priority Data

May 18, 2007 (CN) .......................... 2007 1 0107967

(51) Int. Cl.
*H04L 12/56* (2006.01)
*H04L 12/715* (2013.01)
*H04L 12/751* (2013.01)
*H04L 12/755* (2013.01)
*H04L 12/707* (2013.01)
(Continued)

(52) U.S. Cl.
CPC .............. *H04L 45/04* (2013.01); *H04L 45/02* (2013.01); *H04L 45/021* (2013.01); *H04L 45/22* (2013.01); *H04L 45/28* (2013.01); *H04L 45/58* (2013.01)

(58) Field of Classification Search
USPC ................................................. 370/401, 428
See application file for complete search history.

(56) References Cited

U.S. PATENT DOCUMENTS 6,704,795 B1 * 3/2004 Fernando et al. ............ 709/237
7,130,304 B1 * 10/2006 Aggarwal ..................... 370/389
(Continued)

FOREIGN PATENT DOCUMENTS

| CN | 1543129 A | 11/2004 |
| CN | 1642135 A | 7/2005 |

(Continued)

OTHER PUBLICATIONS

European Patent Office Communication enclosing an extended European search report which includes, pursuant to Rule 62 EPC, the supplementary European search report (Art. 153(7) EPC) and the European search opinion, dated Dec. 28, 2009,—19 pages.

(Continued)

*Primary Examiner* — Brian O'Connor
(74) *Attorney, Agent, or Firm* — Brinks Gilson & Lione

(57) ABSTRACT

A method of route convergence, a routing device, and a main control board in the routing device are provided herein. The method includes receiving route information from multiple neighbor routing devices; selecting a route among the received route information, and applying the selected route to update an FIB of the main control board; and delivering the selected route to an interface board after confirming that the route information from the multiple neighbor routing devices is received and the route selection is completed.

7 Claims, 4 Drawing Sheets

(51) Int. Cl.
    *H04L 12/703*    (2013.01)
    *H04L 12/775*    (2013.01)

(56)    References Cited

U.S. PATENT DOCUMENTS

| | | | |
|---|---|---|---|
| 7,362,700 B2 * | 4/2008 | Frick et al. | 370/219 |
| 7,391,730 B1 * | 6/2008 | Chandra et al. | 370/236 |
| 7,506,194 B2 * | 3/2009 | Appanna et al. | 714/3 |
| 7,633,874 B1 * | 12/2009 | Nalawade et al. | 370/238 |
| 7,688,714 B2 * | 3/2010 | Nalawade et al. | 370/217 |
| 7,710,899 B1 * | 5/2010 | Ward et al. | 370/254 |
| 7,787,360 B2 * | 8/2010 | Windisch et al. | 370/217 |
| 7,848,240 B2 * | 12/2010 | Previdi et al. | 370/238 |
| 8,111,616 B2 * | 2/2012 | Shand et al. | 370/225 |
| 8,176,006 B2 * | 5/2012 | Lin et al. | 707/609 |
| 8,254,396 B2 * | 8/2012 | Appanna et al. | 370/401 |
| 2005/0074003 A1 | 4/2005 | Ball et al. | |
| 2005/0099964 A1 | 5/2005 | Delaney et al. | |
| 2006/0171404 A1 | 8/2006 | Nalawade et al. | |

FOREIGN PATENT DOCUMENTS

| | | |
|---|---|---|
| CN | 1705256 A | 12/2005 |
| CN | 1719831 A | 1/2006 |
| CN | 1744567 A | 3/2006 |
| CN | 1889579 A | 1/2007 |
| CN | 101056270 A | 10/2007 |
| WO | WO 2006/113026 | 10/2006 |

OTHER PUBLICATIONS

Chinese Office Action dated Jun. 6, 2009, in related Chinese Application No. 200710107967.X.

Patent Cooperation Treaty, Written Opinion of the International Searching Authority for Application No. PCT/CN2008/070833, mailed Jul. 24, 2008, 5 pages.

Srihari R. Sangli et al., Graceful Restart Mechanism for BGP draft-ietf-idr-restart-07.txt, Network Working Group Internet Draft Exp. Date: Feb. 2004, 1-10 pages.

International Search Report from P.R. China in International Application No. PCT/CN2008/070833 mailed Apr. 28, 2008.

* cited by examiner

METHOD OF ROUTE CONVERGENCE, ROUTING DEVICE, AND MAIN CONTROL BOARD IN ROUTING DEVICE This application is a continuation of International Application No. PCT/CN2008/070833, filed on Apr. 28, 2008, which claims priority to Chinese Patent Application No. 200710107967.X, filed with the Chinese Patent Office on May 18, 2007, and entitled "Method of Route Convergence, and Routing Device." The entire contents of these applications are hereby incorporated by reference in their entirety.

TECHNICAL FIELD

The present disclosure relates to a route convergence technology, and in particular, to a technology of route convergence performed after a routing device compliant with the requirements of the Graceful Restart (GR) technology is restarted.

BACKGROUND

GR, or smooth restart, is a redundant fault-tolerant technology. It is currently applied widely in active-standby switching and system upgrade. The GR ensures normal forwarding of data when the routing protocol is restarted in order to prevent interruption of key services.

The prerequisite of the GR is that the technology of separating control from forwarding is applied in the routing device. In a routing device with a multi-Route Processor (RP) structure, the processor responsible for routing protocol control is located in the main control board. Specifically, the main control board manages the information in the Forwarding Information Base (FIB). At the same time, the processor responsible for forwarding data is located on the interface board. It accomplishes the effect of guiding the data forwarding only when the FIB information is delivered and stored onto the interface board. On the basis of the multi-RP, the GR process of the routing device is as follows:

(1) When the routing device creates a connection initially, the GR capabilities of the routing device are notified among the local routing device and the neighbor routing device. The GR capabilities include: restart state, restart time, and forwarding state of Address Family Identifier (AFI) and Subsequent Address Family Identifier (SAFI).

(2) When the local routing device is restarted, namely, when the main control board in the local routing device is restarted or switching occurs between the active main control board and the standby main control board, the route information is stored in the FIB on the interface board. Therefore, the local routing device keeps the neighbor relation with the neighbor routing device and goes on forwarding data.

(3) After being restarted, the local routing device is reconnected with the neighbor routing device, and the neighbor routing device sends the stored route information to the restarted local device.

After being restarted, the local routing device may need to be reconnected with multiple neighbor routing devices. If only one path leads to the same destination address, this path is the best route. If multiple paths lead to the same destination address, the local routing device receives different routes from different neighbor routing devices. In this case, the local routing device needs to select a route. The selected route is loaded onto the FIB of the main control board. The main control board delivers the route information in it's FIB to the FIB of the interface board, and the interface board forwards the data according to the updated route information in the FIB.

(4) The local device sends the updated route information to the neighbor routing device, and the neighbor routing device updates the route information. By now, the route convergence after restart of the local device has been completed.

When the restarted routing device has a neighbor routing device, the restarted routing device begins to select a route after receiving the route information from the neighbor routing device, and delivers the selected route through the main control board to the FIB of the interface board, thus guiding the data forwarding. However, when the restarted routing device has multiple neighbor routing devices, if such a method is still applied, it is possible that the restarted routing device has not received the route information of each neighbor routing devices by now and the route selected at this time is not the best. This may ultimately lead to route oscillation.

Specifically, as shown in FIG. 1, it is assumed that the routing device R4 receives the route information of R1 from the neighbor routing devices R2 and R3 after being restarted. Before R4 is restarted, the R1 route sent by R2 is preferred. However, during restart of R4, it is possible that R3 sends the R1 route to R4 first, and then R2 sends the R1 route to R4 later. Consequently, R4 prefers the R1 route sent by R3, and delivers the route to the interface board of R4, thus guiding data forwarding. R4 reselects the R1 route sent by R2 after receiving the R1 route sent by R2, and delivers the route to the interface board of R4, thus guiding the data forwarding. This process leads to interruption of the data forwarding. Moreover, R4 notifies the neighbor routing devices R2 and R1 of the route sent by the newly selected R2, which leads to route oscillation in the network.

Currently, in order to solve the foregoing problems, the restarted routing device is required to select the route only after receiving the routes of each of the neighbor routing devices (namely, after all routes have converged), thus avoiding route oscillation and interruption of data forwarding.

Such a practice avoids route oscillation and interruption of data forwarding in the process of restarting the routing device. However, the restarted routing device selects the route only after receiving the route information of each of the neighbor routing devices. Consequently, when the quantity of routes is large, the time it takes to select the route increases, affecting the speed of route convergence.

SUMMARY

A method of route convergence, a routing device, and a main control board in the routing device are provided herein to avoid route oscillation and data forwarding interruption and to improve the speed of route convergence.

A method of route convergence is provided in an embodiment of the present disclosure. The method includes:

receiving route information sent by multiple neighbor routing devices;

selecting a route from the received route information, and applying the selected route to update a Forwarding Information Base (FIB) of a main control board; and delivering the selected route to an interface board after confirming that route information sent by the multiple neighbor routing devices is received and the route selection is completed.

A routing device is provided in an embodiment of the present disclosure. The routing device includes:

a main control board adapted to receive route information sent by multiple neighbor routing devices, select a route among the received route information, and store the selected route; and deliver the selected route to the interface board after confirming that each of the route information sent by the multiple neighbor routing devices is received and the route selection among the route information is completed; and an interface board adapted to receive the route delivered by the main control board, and update its own route information according to the route.

A main control board is provided in an embodiment of the present disclosure. The main control board includes:

an obtaining unit adapted to receive route information from multiple neighbor routing devices;

a route selecting unit adapted to select a route according to the received route information;

a judging unit adapted to judge whether route information of each of the neighbor routing devices is received, and send a judgment result; and a Forwarding Information Base (FIB) unit adapted to store the route selected by the route selecting unit, and deliver the stored route to the interface board if the judgment result received from the judging unit indicates that route information of each of the neighbor routing devices is received and the route selecting unit finishes the route selection among all route information.

In the process of implementing the embodiment of the present disclosure, the restarted routing device selects a route according to the route information received from the neighbor routing devices, and stores the selected route into the FIB of the main control board; the main control board delivers the selected route to the interface board only after the route information of each of the neighbor routing devices is obtained and the route selection is finished; the route information stored in the FIB of the interface board is updated according to route delivered by the main control board; and the interface board guides the data forwarding according to the route information stored in the FIB of the interface board before the main control board delivers such route information. This embodiment reveals that before the route information of all neighbor routing devices is received, even if the currently selected route is not the best route available before the routing device is restarted, the data forwarding is not affected because the currently selected route is applied to update only the FIB of the main control board rather than the FIB of the interface board, thus avoiding interruption of data forwarding. Moreover, the restarted routing device sends the selected route through the interface board to the neighbor routing device only after completion of selecting all routes, thus avoiding route oscillation. At the same time, the route is selected immediately after the route information is received from the neighbor routing device. By comparison, in the prior art, the route selection begins only after the route information of all neighbor routing devices is received. Therefore, the embodiments of the present disclosure shorten the time of route convergence and improve the speed of route convergence. Especially when the quantity of routes is large, the embodiments of the present disclosure shorten the time of route convergence.

DETAILED DESCRIPTION

A method of fast route convergence is provided in an embodiment of the present disclosure. Route convergence refers to recording all routes into the route selection table. Once the topology structure on the network changes, a time interval exists between the time of change and the time when the route selection tables of all routing devices throughout the network become consistent through updating. The time interval is the time of route convergence.

Figure 1:
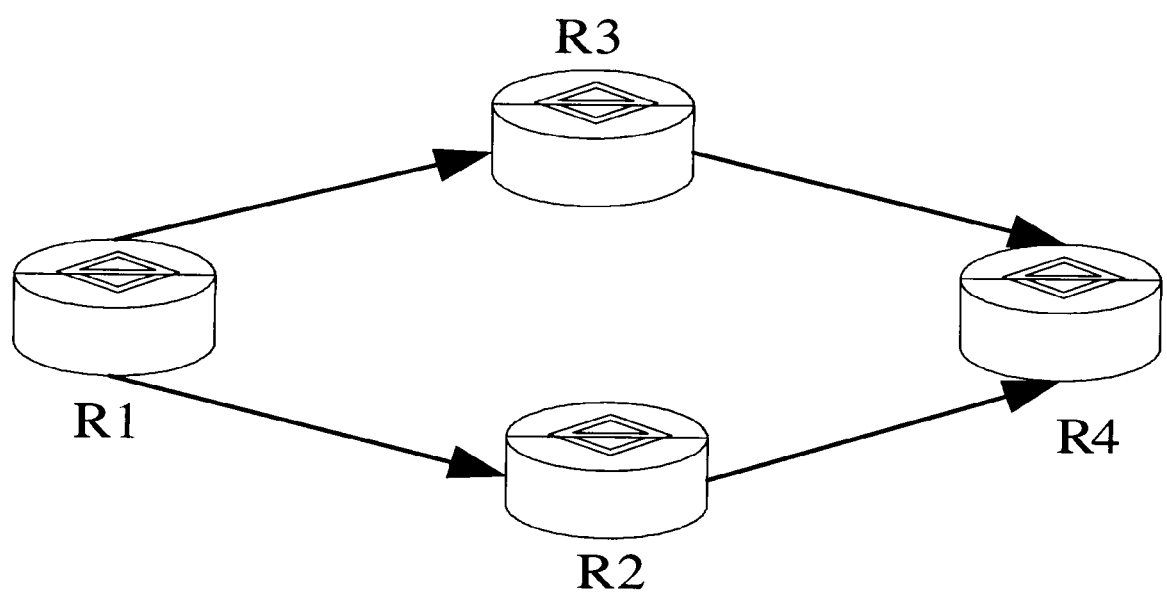
FIG. 1 shows a network structure.
Figure 2:
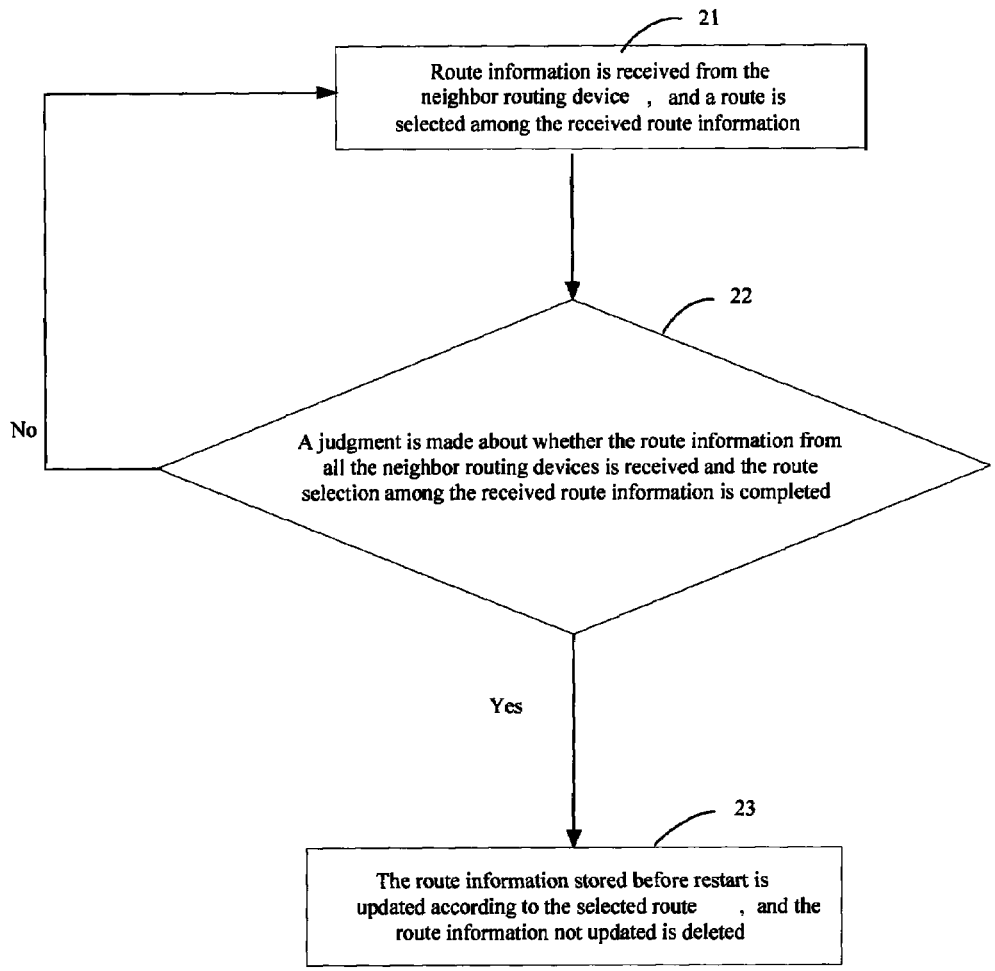
FIG. 2 is a flowchart of a method according to an embodiment of the present disclosure.

FIG. 2 is a flowchart of the method of fast route convergence according to an embodiment of the present disclosure. In the routing device in this embodiment, the processor responsible for data forwarding is located on the interface board. Therefore, the route delivered by the main control board is stored in the FIB of the interface board, and guides the data forwarding. During restart of the routing device (active-standby switching of the main control board), the FIB of the interface board stores the route delivered by the main control board, and maintains the data forwarding, thus fulfilling the technical requirements of the GR. On this basis, after the routing device is restarted and connected with the neighbor device, the method of fast route convergence in this embodiment is implemented in the following way.

The restarted routing device receives the route information stored on the neighbor routing device. According to the protocol, the route information is sorted into Border Gateway Protocol (BGP) route information and Interior Gateway Protocol (IGP) route information, as shown in FIG. 2.

Step 21: The route information is received from the neighbor routing device, including BGP route information and IGP route information. The restarted routing device selects a route among the received route information, namely, performs BGP route selection and IGP route selection respectively, and applies the selected route to update the FIB of the main control board.

Step 22: A judgment is made about whether all neighbor routing devices have finished sending the route information, namely, whether the route information of all neighbor routing devices is received by the restarted routing device. Specifically, the judgment result may be the BGP route information is received completely, or the IGP route information is received completely.

After the judgment result indicates that the route information of all neighbor routing devices is received, if the restarted routing device has finished selecting the route and has stored the route into the FIB of the main control board, the process proceeds to step 23; otherwise, the process returns to step 21, the routing device continues to receive the route information from the neighbor routing device and select routes.

Step 23: The FIB information of the main control board is delivered to the interface board. Subsequently, the interface board updates the FIB of the interface board according to the route delivered by the main control board and deletes the route information not updated on the FIB. The updated route information serves as a guide to data forwarding.

On the basis of the foregoing embodiment, the restarted routing device may update the FIB of the main control board and the FIB of the interface board respectively according to the corresponding protocol. For example, after receiving all BGP route information from the neighbor routing device and selecting a route according to the received BGP route information, the restarted routing device may deliver the BGP route information updated on the main control board to the FIB of the interface board in order to guide the forwarding of the BGP route data. In the BGP route convergence process, the state of the IGP route convergence may be disregarded. Likewise, after receiving all IGP route information from the neighbor routing device and selecting a route according to the received IGP route information, the restarted routing device may deliver the IGP route information updated on the main control board to the FIB of the interface board in order to guide the forwarding of the IGP route data.

Detailed below is a mode in regards to how to restart a GR-supported routing device (active-standby switching of the main control board of the routing device) by using the route convergence method under the present disclosure, taking the BGP as an example.

It is assumed that R1 is a routing device to be restarted and R2 is one of the neighbor routing devices of R1.

An End-of-Rib message is defined in the BGP GR to notify completion of sending the BGP route message. As a routing device to be restarted, R1 may determine that it has received all route information on a neighbor routing device according to the received End-of-Rib messages. If R1 has received the End-of-Rib messages of all neighbor routing devices, R1 determines that it has received all route information stored on all the neighbor routing devices.

When creating a connection initially, the BGP GR-supported routing device announces the BGP GR capability through an OPEN message by means of the dynamic capability negotiation feature of the BGP. The BGP GR capability includes the restart state, restart time, and the forwarding state of AFIs and SAFIs.

Active-standby switching occurs on the main control board of R1. The forwarding of the BGP data goes on without interruption because all BGP route information existent before the active-standby switching of the main control board is already stored in the FIB on the interface board of R1.

After the main control board of R1 finishes the active-standby switching (namely, after R1 is restarted), R1 is reconnected with R2, and marks all BGP routes received from R1 (by affixing a "STALE" flag). Generally, R2 perceives restart of R1 in three modes:

(1) socket disabling;
(2) expiry of hold time;
(3) receiving of the OPEN message that is sent by R1 and carries an "R" flag or "F" flag (the "R" flag indicates restart of the routing device, and the "F" flag indicates that the routing device can keep forwarding data after being restarted).

If R1 is reconnected with R2 successfully, R1 may start an End-Of-Timer timer whose default duration is 600 seconds for R2, and R2 sends all BGP route information stored on R2 to R1. After finishing sending the BGP route information, R2 sends an End-Of-Rib message to R1, and also starts an End-Of-Timer timer whose default duration is 600 seconds.

R1 receives the route information from R2.

In the case that R1 has multiple neighbor routing devices, if R1 receives the BGP route information from the neighbor routing device, R1 selects a route, namely, selects a route among the received route information before completion of sending the route information of all neighbor routing devices. Moreover, R1 applies the selected route to update the FIB on the main control board of R1.

If R1 receives the End-Of-Rib message from all neighbor routing devices, it indicates that R1 has received the route information stored on all neighbor routing devices. Therefore, R1 selects a route among the received route information, deletes the route information not updated in the FIB of the main control board, and delivers the route information in the FIB of the main control board to the interface board.

The interface board of R1 updates the route information existent before active-standby switching of the main control board in the FIB of the interface board, and deletes the route information that is not updated. Moreover, the main control board sends the route information to the neighbor routing device (such as R2) of R1, and sends an End-Of-Rib message after completion of sending the route information.

If R1 fails to receive the End-Of-Rib message from R2 before the End-Of-Timer expires, R1 quits the GR and deletes all BGP route information stored on the interface board at the time of active-standby switching. In the case that R1 has multiple neighbor routing devices, if R1 fails to receive the End-Of-Rib message of all neighbor routing devices before the End-Of-Timer expires, R1 delivers the route information to the interface board, where the route information is selected and applied to update the FIB of the main control board before the End-Of-Timer expires. The interface board updates the route information which existed before active-standby switching of the main control board in the FIB of the interface board and deletes the route information that is not updated.

With respect to R2, R2 deletes all the route information in the "STALE" state if the End-Of-Timer timer of R2 expires or the End-Of-Rib message is received from R1. For other neighbor routing devices of R1, the processing mode of R2 applies.

It is understandable to those skilled in the art that all or part of the steps in the foregoing embodiments may be performed through hardware instructed by a program. The program may be stored in a computer-readable storage medium such as ROM/RAM, magnetic disk, and compact disk. When being executed, the program performs these steps:

receiving the route information of multiple neighbor routing devices, selecting a route among the received route information, and storing the route selection result in the first FIB;

confirming that all route information of the multiple neighbor routing devices is received and the route selection is completed; and updating the second FIB according to the information of the first FIB, where the second FIB is adapted to guide the packet forwarding.

Figure 3:
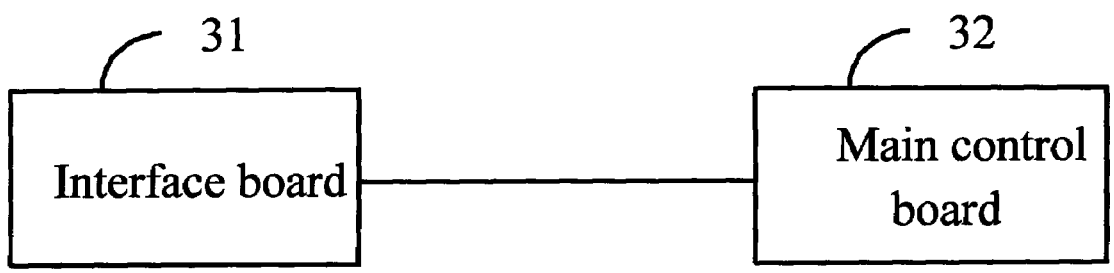
FIG. 3 shows a structure of a routing device according to an embodiment of the present disclosure.

A routing device is also provided herein. As shown in FIG. 3, the routing device includes:

a main control board 32 adapted to receive route information sent by multiple neighbor routing devices, select a route among the received route information, and store the selected route; and deliver the selected route to the interface board after confirming that all route information sent by the multiple neighbor routing devices is received and the route selection among all the route information received by the receiving board is completed; and an interface board 31 adapted to receive the route delivered by the main control board, update the stored route information according to the route, and forward data according to the route.

The main control board includes:

an obtaining unit adapted to receive route information from multiple neighbor routing devices;

a route selecting unit adapted to select a route according to the received route information;

a judging unit adapted to judge whether all route information of all the neighbor routing devices is received, and send a judgment result; and an FIB unit adapted to store the route selected by the route selecting unit, and deliver the stored route to the interface board if the judgment result received from the judging unit indicates that all route information of all the neighbor routing devices is received.

The main control board further includes a timer. The timer is triggered to start timing when the obtaining unit receives the first route information from the neighbor routing devices, and notifies the judging unit when the preset duration of the timer expires.

The judging unit is further adapted to trigger the FIB unit to deliver the stored route information to the interface board if determining that all route information from the neighbor routing devices is not received within the preset duration.

On the basis of the foregoing embodiment, the main control board delivers the selected route information to the interface board, and sends the selected route information to the neighbor routing device.

On the basis of the foregoing embodiment, after the main control board of the routing device finishes active-standby switching, the interface board stores the route information existent before active-standby switching of the main control board within a certain period. Within this period, if the main control board receives any route from the neighbor routing device again, the interface board updates the stored route information existent before active-standby switching of the main control board according to the selected route after the route is selected, and deletes the route that is not updated. When this period expires, no matter whether the main control board receives the route information of all neighbor routing devices or not, the route information selected before expiry of the period is delivered to the interface board. The interface board updates the stored route information existing before active-standby switching of the main control board according to the selected route information, and deletes the route that is not updated.

In summary, in the embodiment that involves the timing technology, the timing function performs timing for the route information of all neighbor routing devices not received by the restarted routing device upon expiry of the foregoing period, the route information of the interface board is updated, and the route information not updated is deleted. Therefore, the reliability of data forwarding of the interface board is improved. In practice, the duration of the foregoing period is generally about 600 seconds. If any route information is not updated within about 600 seconds after the restarted routing device is connected with the neighbor routing device, such route information needs to be deleted.

The route information may be BGP route information or IGP route information.

Figure 4:
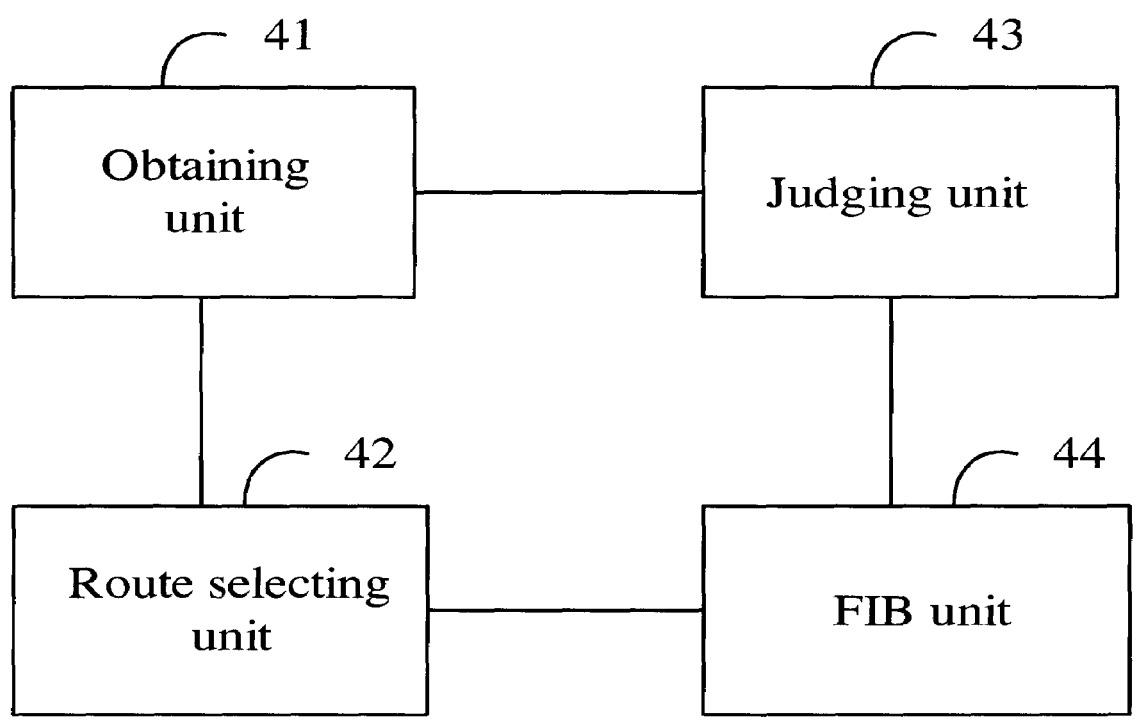
FIG. 4 shows a structure of the first main control board according to an embodiment of the present disclosure.

A main control board is also provided in an embodiment of the present disclosure and applied in the routing device under the present disclosure. As shown in FIG. 4, the main control board includes:

an obtaining unit 41 adapted to receive information from multiple neighbor routing devices, where the information includes route information from the neighbor routing devices;

a route selecting unit 42 adapted to select a route according to the received route information;

a judging unit 43 adapted to judge whether all route information of all the neighbor routing devices is received, and send a judgment result; and an FIB unit adapted to store the route selected by the route selecting unit, and deliver the stored route to the interface board if the judgment result received from the judging unit indicates that all route information of all the neighbor routing devices is received and the route selecting unit finishes the route selection.

Figure 5:
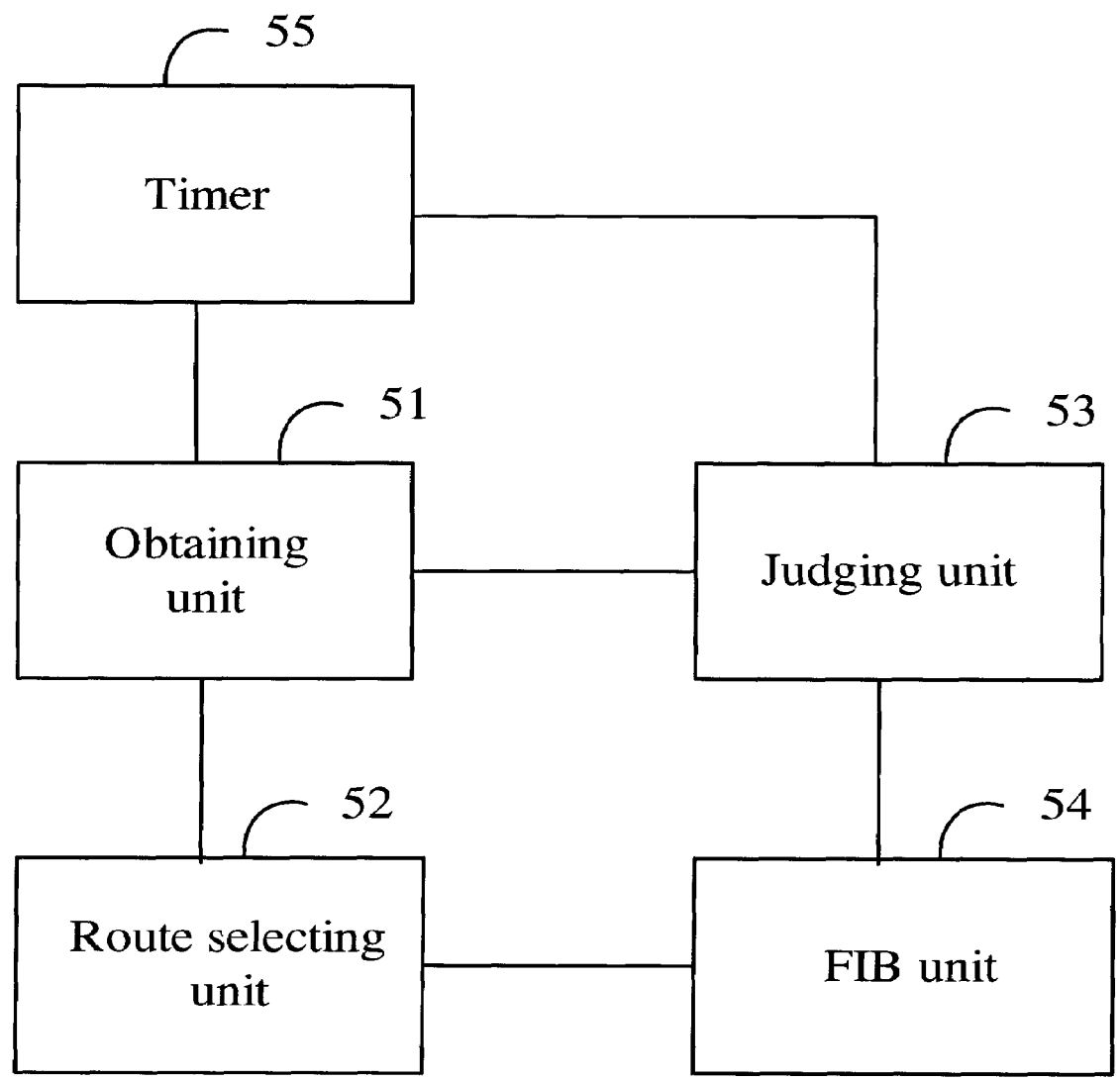
FIG. 5 shows a structure of the second main control board according to an embodiment of the present disclosure.

On the basis of the foregoing embodiment, another structure of the main control board is provided in an embodiment of the present disclosure. As shown in FIG. 5, the main control board includes:

an obtaining unit 51 adapted to receive information from neighbor routing devices, where the information includes route information from the neighbor routing devices;

a timer 55 which is triggered to start timing when the obtaining unit receives the first information from the neighbor routing devices, and notifies the judging unit upon expiry of the preset duration of the timer;

a route selecting unit 52 adapted to select a route according to the received route information;

a judging unit 53 adapted to trigger the FIB unit to deliver the stored route information to the interface board if determining that all route information from the neighbor routing devices is not received within the preset duration; and an FIB unit 54 adapted to store the route information selected by the route selecting unit.

If the judging unit determines that the route information from all neighbor routing devices is received and the route selecting unit finishes the route selection before the preset duration of the timer expires, the FIB unit delivers the stored route information to the interface board.

If the judging unit determines that the route information from all neighbor routing devices is not received before the preset duration of the timer expires, the FIB unit delivers the stored route information to the interface board.

The route information may be BGP route information and/or IGP route information.

In summary, in the process of implementing the embodiments of the present disclosure, the restarted routing device selects a route according to the route information received from the neighbor routing devices, and stores the selected route into the FIB of the main control board; the main control board delivers the selected route to the interface board only after the route information from all the neighbor routing devices is obtained and the route selection is finished; the route information stored in the FIB of the interface board is updated according to the route delivered by the main control board; and the interface guides the data forwarding according to the route information stored in the FIB of the interface board before the main control board delivers such route information. This embodiment reveals that before the route information of all neighbor routing devices is received, even if the currently selected route is not the best route available before the routing device is restarted, the data forwarding is not affected because the currently selected route is applied to update only the FIB of the main control board rather than the FIB of the interface board, thus avoiding interruption of data forwarding. Moreover, the restarted routing device sends the selected route through the interface board to the neighbor routing device only after completion of selecting all routes, thus avoiding route oscillation. At the same time, the route is selected immediately after the route information is received from the neighbor routing device. The embodiments of the present disclosure may shorten the time of route convergence and improve the speed of route convergence, particularly when the quantity of routes is large.

Detailed above are a route convergence method and a routing device provided in an embodiment of the present disclosure. Although the disclosure is described through some exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed is:

1. A method of route convergence, the method comprising:
    receiving, by a restarted router, first route information of a first neighbor routing device belonging to multiple neighbor routing devices;
    selecting, by the restarted router, a first operational route from received route information comprising the first route information;
    updating, by the restarted router, the first operational route to a Forwarding Information Base (FIB) of a main control board instead of an interface board;
    determining whether the first operational route is not a best route selected based on route information of all the multiple neighbor routing devices;
    receiving, by the restarted router, second route information of a second neighbor device belonging to the multiple neighbor routing devices, after updating the first operational route to the FIB and determining the first operational route is not the best route;
    selecting, by the restarted router, a second operational route from received route information comprising the first route information and the second route information;
    updating, by the restarted router, the second operational route to the FIB of the main control board;
    determining whether the second operational route is the best route;
    delivering, by the restarted router, the best route to the interface board after determining the second operational route is the best route.

2. The method of route convergence according to claim 1, further comprising:
    updating, by the interface board, stored route information according to the best route, wherein the updated route information is adapted to guide packet forwarding.

3. The method of route convergence according to claim 1, wherein:
    the first route information of the first neighbor routing device comprises Border Gateway Protocol (BGP) route information and/or Interior Gateway Protocol (IGP) route information.

4. The method of route convergence according to claim 1, further comprising:
    sending, by the main control board, the best route to the multiple neighbor routing devices.

5. The method of route convergence according to claim 2, further comprising:
    sending, by the main control board, the best route information to the multiple neighbor routing devices.

6. The method of route convergence according to claim 3, further comprising:
    sending, by the main control board, the best route information to the multiple neighbor routing devices.

7. A routing device, comprising:
    a main control board; and
    an interface board, wherein:
    the main control board is adapted to:
    receive first route information of a first neighbor routing device belonging to multiple neighbor routing devices,
    select a first operational route from received route information comprising the first route information,
    update the first operational route to a Forwarding Information Base (FIB) of the main control board instead of the interface board,
    determine whether the first route information is not a best route selected based on route information of all the multiple neighbor routing devices,
    receive second route information of a second neighbor device belonging to the multiple neighbor routing devices, after updating the first operational route to the FIB and determining the first operational route is not the best route,
    select a second operational route from received route information comprising the first route information and the second route information,
    update the second operational route to the FIB of the main control board,
    determine whether the second operational route is the best route,
    deliver the best route to an interface board after determining the second operational route is the best route; and
    wherein the interface board is adapted to receive the best route delivered by the main control board, and update route information of the interface board according to the best route selected by the main control board.

* * * * *